United States Patent
Devegili et al.

(10) Patent No.: US 11,235,335 B2
(45) Date of Patent: Feb. 1, 2022

(54) CRUSHING DEVICE AND METHOD FOR CRUSHING RAW MATERIALS

(71) Applicant: NETZSCH-Feinmahltechnik GmbH, Selb (DE)

(72) Inventors: Sergio Devegili, Rio doe Cedros Pomerode (BR); Theron Harbs, Selb (DE)

(73) Assignee: NETZSCH-Feinmahltechnik GmbH, Selb (DE)

( * ) Notice: Subject to any disclaimer, the term of this patent is extended or adjusted under 35 U.S.C. 154(b) by 383 days.

(21) Appl. No.: 15/773,674

(22) PCT Filed: Oct. 27, 2016

(86) PCT No.: PCT/DE2016/000382
§ 371 (c)(1),
(2) Date: May 4, 2018

(87) PCT Pub. No.: WO2017/076382
PCT Pub. Date: May 11, 2017

(65) Prior Publication Data
US 2018/0318840 A1     Nov. 8, 2018

(30) Foreign Application Priority Data
Nov. 4, 2015    (DE) .......................... 102015118858.9

(51) Int. Cl.
*B02C 2/10*      (2006.01)
*A47J 42/06*     (2006.01)
*A47J 42/10*     (2006.01)

(52) U.S. Cl.
CPC ................. *B02C 2/10* (2013.01); *A47J 42/06* (2013.01); *A47J 42/10* (2013.01)

(58) Field of Classification Search
CPC .. A47J 42/06; A47J 42/02; A47J 42/04; A47J 42/08; A47J 42/00–42/10; A23G 1/042; A23G 1/06; B02C 2/00; B02C 2/10
(Continued)

(56) References Cited

U.S. PATENT DOCUMENTS 8,425 A * 10/1851 Newlove .................. B02C 7/02
                                                      241/157
1,593,854 A    7/1926 Snyder
(Continued)

FOREIGN PATENT DOCUMENTS

CN     102755918 A     10/2012
EP     1122356 A2      8/2001
(Continued)

OTHER PUBLICATIONS

Translation: Cheng et al—CN102755918B—Translated Jul. 9, 2020 (Year: 2012).*
(Continued)

*Primary Examiner* — Matthew Katcoff
*Assistant Examiner* — Smith Oberto Bapthelus
(74) *Attorney, Agent, or Firm* — Whitmyer IP Group LLC

(57) ABSTRACT

A method and crushing device for coarse-grained material. The crushing device includes one first axially rotatable grinding mechanism and a second grinding mechanism which is fixed with respect to the first axially rotatable grinding mechanism. The second grinding mechanism accommodates the first axially rotatable grinding mechanism and is in operative connection with the first axially rotatable grinding mechanism for the purpose of crushing the coarse-grained material. The axially rotatable grinding mechanism has one transport channel for the respective material to be crushed. The transport channel includes a first section extending axially and a second section which adjoins
(Continued)

the first section at an angle and passes through an outer lateral surface of the axially rotatable grinding mechanism.

17 Claims, 8 Drawing Sheets

(58) Field of Classification Search
USPC .................................................. 241/261.1
See application file for complete search history.

(56) References Cited

U.S. PATENT DOCUMENTS

| | | | | |
|---|---|---|---|---|
| 2,738,930 | A | * | 3/1956 | Schneider ........... B01F 7/00816 241/162 |
| 6,637,686 | B2 | * | 10/2003 | Antensteiner ............ D21D 1/22 241/259.1 |
| 8,235,317 | B2 | * | 8/2012 | Wilson .................... A47J 42/10 241/169.1 |
| 8,632,029 | B1 | | 1/2014 | Cato |
| 9,277,838 | B2 | * | 3/2016 | de Graaff ................ A47J 42/50 |
| 2006/0219830 | A1 | * | 10/2006 | Nilsson-Wulff ........ B02C 2/005 241/207 |

FOREIGN PATENT DOCUMENTS

| | | |
|---|---|---|
| EP | 1818100 A1 | 8/2007 |
| WO | 2015055161 A1 | 4/2015 |

OTHER PUBLICATIONS

Translation of International Search Report Application No. PCT/DE2016/000382 Completed: Jan. 31, 2017; dated Feb. 8, 2017 3 pages.

International Search Report and Written Opinion of the International Searching Authority Application No. PCT/DE2016/000382 Completed: Jan. 31, 2017; dated Feb. 8, 2017 15 pages.

* cited by examiner

T60/h = L62/L33 = 0,9 = 90%

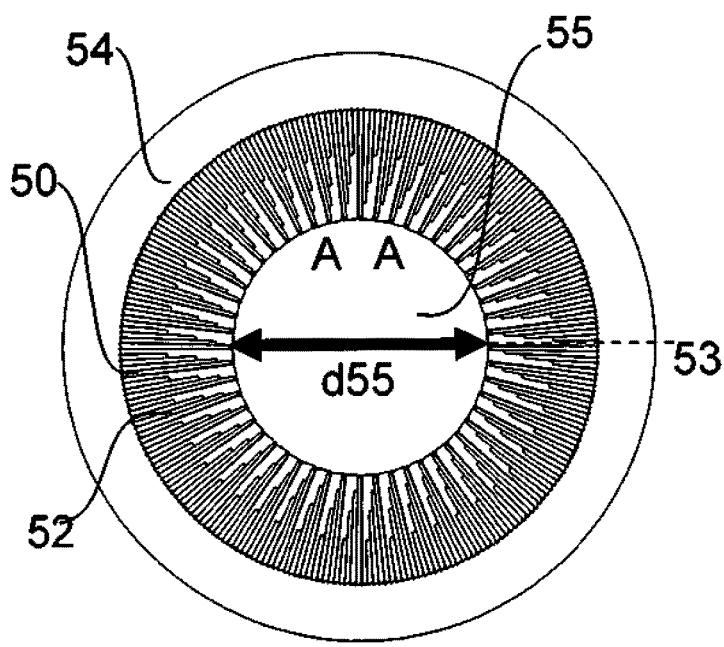
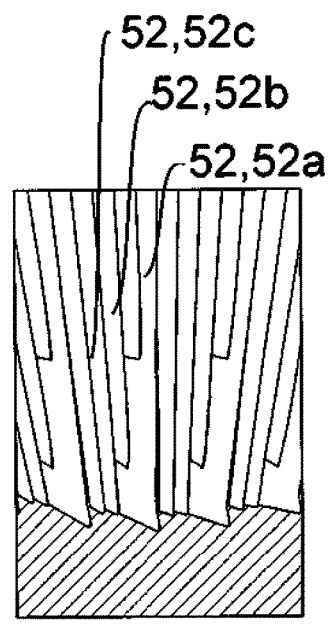
Fig. 4A  Fig. 4B
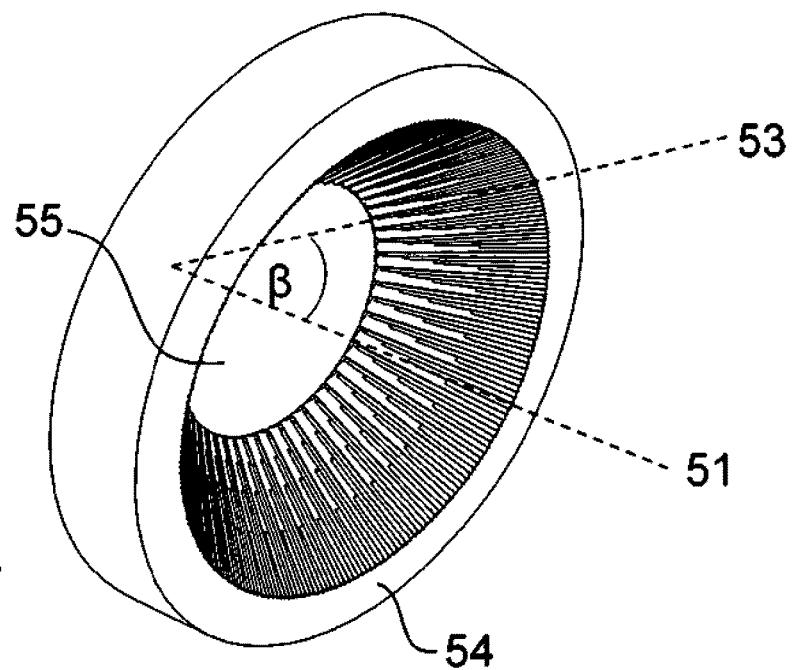
Fig. 4C

CRUSHING DEVICE AND METHOD FOR CRUSHING RAW MATERIALS

TECHNICAL FIELD

The present invention concerns a crushing device and a method for crushing raw materials.

BACKGROUND

The invention relates to a device for pre-crushing coarse-grained raw materials which are then passed to a further processing step. The invention relates in particular to pre-crushing foodstuffs for subsequent inclusion in chocolates and compound masses or the like, wherein for example nuts, almonds, sugar, cocoa beans, coffee beans or other, in particular also fibrous foods must pre-crushed and in particular finely ground for further processing.

U.S. Pat. No. 1,593,854 B describes a device for breaking wheat grains into coarse components with a minimum content of fine material. The device comprises a rotationally driven crushing cone with external teeth which is arranged inside a statically disposed hollow cone crusher with corresponding internal teeth.

EP 1818100 A1 discloses a grinder for crushing granular material, for use particularly in the food sector, comprising a first and a second grinding element. A grinding gap is formed between these two elements. One of the grinding elements is designed to be rotatable, the other grinding element is static. At least one coupling element is provided in the drive chain between the drive unit and the non-stationary grinding element and is constructed with rubber elastic properties so that the drive is coupled elastically to the non-stationary grinding element.

Pre-crushing devices are often also included as components of machines for further processing. For example, WO 2015/055161 A1 describes a pre-comminuting device for a ball mill. A crushing ring with internal gearing forms a first stationary crushing means. The pre-crushing device further comprises a second rotary crushing means having a first and a second partial area, wherein an external gearing of the first partial area engages in the internal gearing of the first partial area, forming a crushing gap.

SUMMARY

The object of the invention is to achieve improved crushing of raw materials together with less susceptibility to contamination of the grinding means.

The object stated above is solved with a crushing device and a method for crushing raw materials that have the features described in the invention.

The invention relates to a crushing device consisting of at least two parts, for crushing coarse-grained material, in particular coarse-grained materials from the foodstuff sector. This means that the crushing device is used in particular to crush cocoa beans, coffee beans, nuts, granulated sugar, broken chocolate or similar. Such a crushing device may further be used for crushing intermediate products as well as fibrous raw materials and/or intermediate products such as meat and/or meat products, for example.

The crushing device comprises at least one first axially rotatable grinding means and at least one second grinding means which is fixed with respect to the at least one first axially rotatable grinding means, wherein said second grinding means accommodates the at least one first axially rotatable grinding means and is in operative connection with the at least one first axially rotatable grinding means for the purpose of crushing the coarse-grained material. A grinding gap is formed for example between the first and the second grinding means, through which the crushed or ground product passes and can be transported out of the crushing device and delivered to a further processing step.

According to the invention, it is provided that the at least one axially rotatable grinding means has at least one transport channel for the respective material to be crushed. The transport channel is formed from at least one first section extending axially and at least one second section, wherein the second section adjoins the first section at an angle and penetrates an outer lateral surface of the axially rotatable grinding means.

According to one embodiment of the invention it may be provided that the lateral surfaces of the first and the second grinding means which face each other are each furnished with teeth, which support the crushing process. According to a preferred embodiment, similarly to the devices known from the related art, the crushing device includes as the first grinding means a rotationally driven crushing cone which is disposed inside the second grinding means which has the form of a fixed position hollow cone crusher. In particular, the basic shape of the crushing cone is a straight circular cone with an apex, a lateral surface, a cone axis and a base surface. The statically arranged hollow cone crusher surrounds the crushing cone, forming a grinding gap and in the following will also be referred to as a funnel due to its shape.

The crushing cone or circular cone may preferably have "external teeth" on its outer lateral surface, and the hollow cone crusher or funnel may have in particular corresponding "internal teeth" on its inner lateral surface, which further assist the crushing of the material. Both the crushing cone and the hollow cone crusher may have a progressive toothing arrangement. This means in particular that the tooth density in a region in which the material to be crushed is transported is lower than in a more distant region, in which the actual crushing takes place. The teeth on the crushing cone and/or hollow cone crusher may be designed with an angle relative to the longitudinal axis.

The unit consisting of a first and a second grinding means will also be referred to as the crushing unit in the following. Besides the crushing unit, the crushing device preferably comprises a raw material inlet, through which the raw material to be crushed is fed into the crushing unit, and a product outlet, through which the crushed product is discharged from the crushing device and optionally transported to a further processing stage.

According to the invention, it is provided that a first grinding means in the form of a circular cone does not have an apex, but instead—seen from above—has a slotted structure which is created in particular by the design of the transport channel. The slotted structure is designed in such a way that the raw material to be crushed, which first passes into the crushing unit in the region of the missing cone apex, encounters a smooth surface in an inner region of the circular cone, where it is accelerated radially and forwarded to the crushing areas formed between the first and second grinding means.

The slotted structure is formed due to the fact that the circular cone has a first section which extends axially from the cone apex towards the base surface at least in regions thereof. The circular cone further comprises at least one second section which adjoins the first section at an angle, and which extends from the cone apex towards the base surface along a generatrix of the circular cone at least in regions thereof.

The first and the at least one second section of the circular cone are in particular connected by at least one third section, which extends radially from the first section or from the cone axis out to the at least one second section or to the generatrix of the circular cone.

The circular cone preferably comprises at least two second sections, which are each connected to the first axial section via two third sections. In particular, the at least two second sections are arranged regularly with respect to the cone axis, so that when the circular cone rotates about the cone axis an even movement can be performed without unbalance.

According to a first embodiment of the invention, the circular cone has two second sections, which extend along opposite generatrixes. The two second sections are each connected to the first section via two third sections. Since the second sections lie opposite one another on the lateral surface of the circular cone, the two third sections are aligned flush with each other. In other words, in this case it is sufficient to have a single third section which extends straight from a second section or generatrix to the other second section or the opposite generatrix, and wherein the third section is divided into two section regions of equal size by the cone axis, which regions in particular have the form of regions mirrored at the cone axis.

According to a further embodiment of the invention, the circular cone has at least three second sections, which are arranged at 120 degree intervals on the lateral surface. The three second sections are each connected to the first section via a third section, wherein the three third sections are each arranged with a 120 radial offset from the axis of the circle or from the first section out to the respective second section.

A particularly preferred embodiment is also described in which the circular cone has at least four second sections, which are arranged at intervals of 90 degrees on the lateral surface. The second sections are arranged opposite each other and are each connected to each other and to the first section by a third section which passes through the cone axis, wherein the third section extends from a second section to the opposite second section and passes through the cone axis and the first section. Similarly to the first embodiment described previously, the third section which connects the second sections arranged opposite each other may also be considered as two flush aligned third sections between the first axial section and one second section in each case.

It is preferably provided that relatively large areas of the first grinding means, particularly of the circular cone are missing due to the first, the at least one second and the at least one third section, so that an open hollow space is formed in the interior of the first grinding means, that is to say the circular cone, viewed from the cone apex. The lateral surface of the first grinding means or the circular cone is also interrupted at least in areas by the at least one second section.

The at least one second section preferably creates a connection to a hollow space formed by the first axial section via the at least one third section. In particular, the hollow space is surrounded by subregions of the lateral surface of the first grinding means or the circular cone.

The raw material inlet is arranged at least partly inside the open hollow space, in particular in the area of the first axial section. The raw material or supplied coarse-grained material is accelerated radially inside the hollow space and fed directly to the areas in which the main crushing operation takes place via the third and second sections. The raw material is thus delivered to areas for example, wherein a grinding gap is formed between the first and second grinding means. In particular, the material is transported to areas of the circular cone close to the base surface.

According to one embodiment of the invention, the first axial section has a depth which is equivalent to between 5% and 95% of the distance between an intersection point of the base surface with the cone axis and the cone apex. In particular, the depth of the first section is equivalent to between 50% to 95% of the distance between an intersection point of the base surface with the cone axis and the cone apex. The depth of the first section is particularly preferably equivalent to at least 80% of the distance between an intersection point of the base surface with the cone axis and the cone apex.

The length of the second sections is in particular adjusted to the depth of the first axial section similarly. It is preferably provided that the at least one second section extends along a partial length of the total length of the generatrix from the cone apex towards the base surface, which partial length is equal to a percentage of the depth of the first section relative to the distance between the intersection point of the base surface with the cone axis and the cone apex. This means, if the first section has a depth which is equivalent to 90% of the height of the initial circular cone, then the partial length of the second section along the generatrix seen from the cone apex is equivalent to 90% of the total length of a generatrix between cone apex and base surface of the circular cone.

The surface of the transport channel of the first grinding means is in particular smooth and offers little friction, so that the coarse-grained material does not stick to it, but is accelerated along the at least one transport channel and fed to the crushing areas by the rotation of the first grinding means.

According to one embodiment it may be provided that the at least one third radial section connects the at least one second section to the first axial section in such manner that an at least substantially flat, preferably smooth, low-friction surface is created in a plane parallel to the base surface of the circular cone inside the circular cone. The material which is fed in through the raw material inlet thus does not come into contact with the toothed outer lateral surface of the circular cone immediately. Instead, the material first encounters the smooth, low-friction surface inside the hollow space formed by the sections.

According to an alternative embodiment, the at least one second section extends along a partial length of the total length of the generatrix from the cone apex towards the base surface which is at least one percent greater than the percentage of the depth of the first section relative to the distance between the intersection point of the base surface with the cone axis and the cone apex. If the third connecting section is constructed correspondingly, a convex surface is formed inside the circular cone. In particular, the at least one third radial section connects the at least one second section to the first axial section in such manner that a surface is formed inside the circular cone, which surface is convex relative to the base surface of the circular cone, wherein the greatest distance between the convex surface and the base surface is preferably formed in the area of the cone axis.

According to one embodiment of the invention, the second grinding means can be cooled. For this purpose, cooling chambers are assigned to the second grinding means and may be filled with a coolant to counteract warming or overheating of the second grinding means and of the raw material being processed as a result of the rotation of the first grinding means and the resulting movement and friction of the supplied raw material. Because of the cooling system, even temperature-sensitive raw materials can be processed in the crushing device.

In particular, the second grinding means in the form of a hollow cone crusher or funnel can also be cooled. For this purpose, cooling chambers are arranged on the outside of the hollow cone crusher or funnel.

It may further be provided that both the static second grinding means and the rotatable first grinding means may each be constructed with several parts. When a product is changed, various grinding grades may be preset for the desired product by replacing individual parts of the of the first and/or second grinding means. For example, the distance between the first and the second grinding means in the area of the cone apex can be altered by using a first grinding means with a different pitch, which has a direct effect on the processing of the respective feedstock material. The toothing arrangement of the first and/or second grinding means may also be adapted to the raw material in question of the desired grinding grade of the product. It is also possible the change the size of the grinding gap by replacing individual regions of the first and/or second grinding means.

The components of the crushing device that process the raw material, particularly the crushing unit, including the first and the second grinding means, are preferably made from a wear-resistance material such as ceramic, hardened steel for example, or another suitable material. In particular, materials are used which are harder than the raw materials which are to be processed, to avoid abrasion and thus also contamination of the product.

In the case of the crushing device according to the invention for the foodstuffs industry, when the first and second grinding means are dimensioned appropriately the raw material supplied for processing may have a diameter of up to 200 mm, wherein a grinding grade of the ground product in a range between 30-250 μm may be achieved. The crushing device according to the invention is thus capable of delivering a grinding fineness corresponding approximately to one thousandth of the size of the material at input.

A very high cutting frequency can be generated with the crushing device according to the invention due to the design of the teeth on the outer lateral surfaces of the first grinding means, particularly due to a large number of teeth, which results in a high tooth density. For example, a cutting frequency of more than 1 million cuts per second can be generated depending on the machine size and the number and/or density and/or size of the teeth.

The crushing device according to the invention also enables improved cleaning capabilities in the circuit or as a CIP process (clean in place) as a preferably self-pumping system. This is due firstly to the fact that the material is less susceptible to forming deposits and/or adhering to the surfaces inside the crushing unit in the first place. Secondly, the advantageous guidance via the first, second and third sections due to centrifugal force is also effective for the cleaning fluid used.

Moreover, the crushing device according to the invention can also continue to work efficiently when the raw material or feedstock inlet funnel is full. A common problem with many conventional systems is that when the feedstock inlet funnel the feedstock sticks at the inlet to the grinding space, causing the contents of the funnel to move as well. The nuts, for example, or other raw materials etcetera also rotate at the raw material inlet because of the accumulated deposit and so set the entire contents of the funnel in motion. With the new system according to the invention, no adhesion occurs at the raw material inlet during transfer to the grinding space formed between the first and the second grinding means, and so there is also no undesirable movement of the feedstock or raw material or the like.

Furthermore, a crushing device according to the invention does not need a pump for short distances within the crushing device. This can be attributed particularly to the pumping effect resulting from the radial acceleration.

The invention further relates to a method for crushing a coarse-grained material, particularly for crushing a coarse-grained material in the foodstuffs industry, in a crushing device comprising at least one first, axially rotatable grinding means and at least one second grinding means which is fixed with respect to the at least one first axially rotatable grinding means, which second grinding means accommodates the at least one first axially rotatable grinding means and is in operative connection with the at least one first axially rotatable grinding means for the purpose of crushing the coarse-grained material, wherein the supplied material is accelerated radially upon entry into the crushing device and is fed to the first grinding means of the crushing system via at least one transport channel.

In particular it is provided that upon entering the crushing device, particularly a crushing unit consisting of a first and a second grinding means of the crushing device, the supplied material encounters a smooth surface of the transport channel of the first grinding means, is accelerated radially and thus fed particularly rapidly to a coarse crushing area. This radial acceleration is generated due to the fact that the first grinding means is operated rotationally and has at least one wide breakthrough designed as a transport channel, through which the supplied material is guided to a crushing zone between the first grinding means and the second grinding means. The at least one breakthrough which forms the transport channel is formed in particular by the first and at least one second and optionally at least one third section of the first grinding means described previously.

A crushing device as described previously is particularly suitable for performing the method.

The radial acceleration of the supplied raw material which takes place even before the actual crushing process particularly serves to prevent any precrushed product from sticking to the interior surfaces in the material feed region, which then becomes clogged and must be cleaned. This enables the crushing device to work continuously without interruption.

BRIEF DESCRIPTION OF THE DRAWINGS

In the following section, exemplary embodiments of the invention and their advantages will be explained in greater detail with reference to the accompanying figures. The proportional sizes of the individual elements relative to each other in the figures do not always reflect actual proportions, since some forms presented are simplified and others are presented larger than other elements for better illustration.

FIGS. 4A to 4C show different views of a second embodiment of a second grinding means.

DETAILED DESCRIPTION

The same reference signs are used for elements of the invention which are identical or have identical function. Also for the sake of clarity, only those reference signs which are essential for the description of an individual figure are shown in the respective figures. The embodiments shown are intended only to exemplify the way the device according to the invention and the method according may be designed, they do not constitute any defining limitation thereof.

Figure 1A:
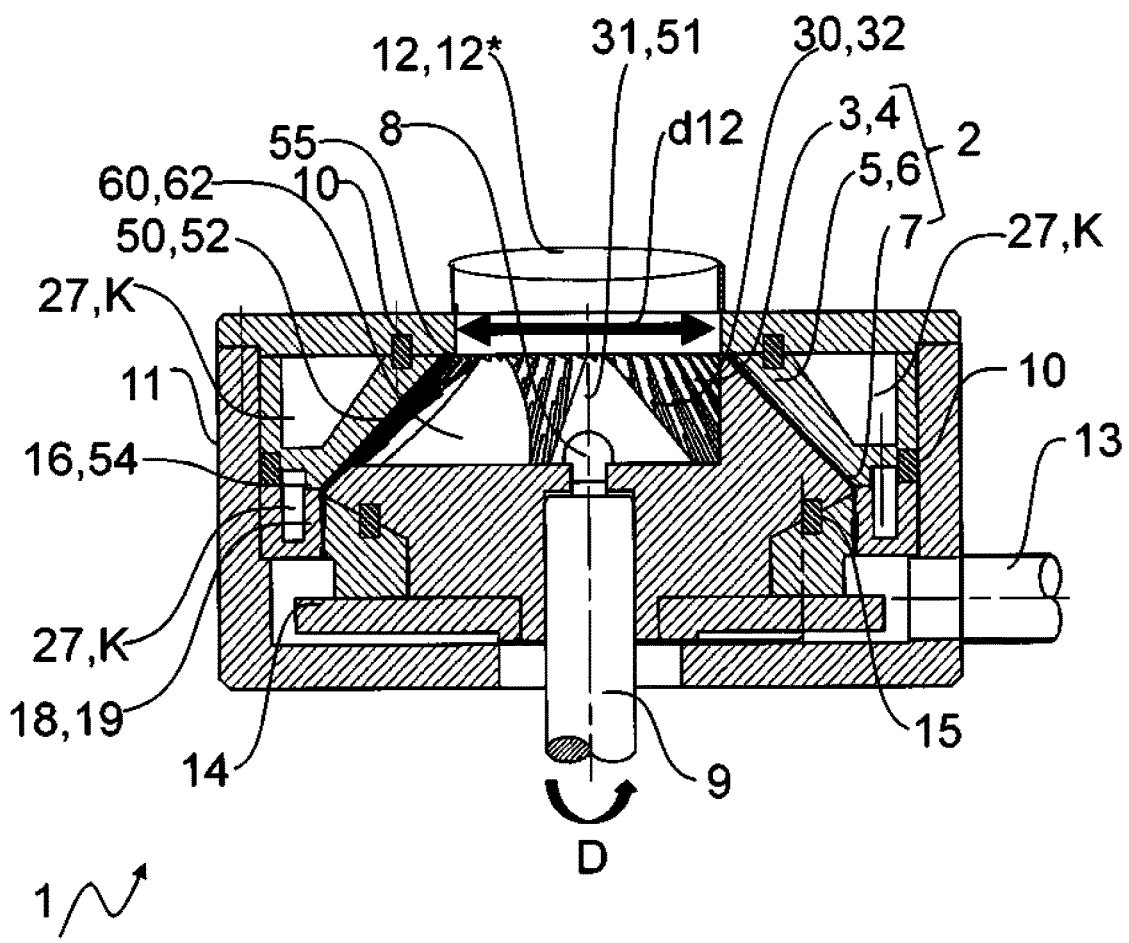
FIGS. 1A and 1B each show a schematic view of a crushing unit of a crushing device.
Figure 1B:
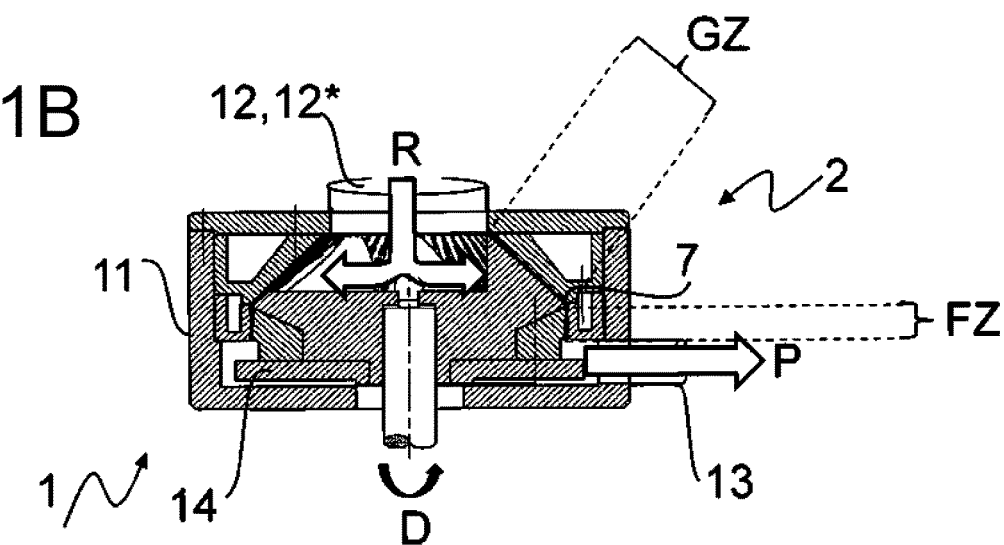

FIGS. 1A and 1B each show a schematic view of a crushing unit 2 that comprises a first axially rotatable grinding means 3 and a second grinding means 5. Second grinding means 5 is arranged so as to be stationary with respect to the first axially rotatable grinding means and accommodates at least a part of it. The first and second grinding means 3, 5 are in operative connection with each other for the purpose of crushing a supplied coarse raw material R.

The first and the second grinding means 3, 5 are arranged in such manner that a grinding gap 7 is formed between them. In the present embodiment, the first axially rotatable grinding means 3 is connected to a driveshaft 9 via an attachment means 8 and is driven rotationally about an axis of rotation D by means of driveshaft 9. The second, stationary grinding means 5 is fixed immovably on and/or inside the housing 11 that surrounds crushing unit 2 via attachment means 10.

According to an alternative embodiment—not shown—it is also possible to construct the first grinding means in static fashion and arrange the second grinding means so that it can rotate.

Crushing device 1 further comprises a raw material inlet 12, through which coarse-grained raw materials R such as cocoa beans, coffee beans, whole nuts, coarsely chopped nuts or the like are introduced into crushing device 1, and a product outlet 13, through which crushed and finely ground product P is discharged. The flow of the raw material and product inside the crushing device is represented in FIG. 1B with arrows. The removal of the product P is assisted in particular by a discharge rotor 14, which is attached directly to the rotationally driven first grinding means 3 via attachment means 15, and is thus mounted together therewith on driveshaft 9 and can be rotated about axis of rotation D.

The first grinding means 3 in particular has the form of a cone or a truncated cone with external teeth 32 formed on the lateral surface 30 thereof. The basic shape of the cone is in particular a straight circular cone 4 having a cone axis 31. Cone axis 31 is preferably aligned coaxially with the axis of rotation D of driveshaft 9.

The second grinding means 5 in particular has the form of a funnel 6 with "internal teeth" 52 formed on the inner lateral surface 50 thereof. It may further be provided that an additional crushing ring 18 with internal teeth 19 is arranged on funnel 6 in the area of funnel head 16 thereof, i.e. in the area of a large funnel opening 54. A grinding gap 7 is formed preferably between the first and the second grinding means 3, 5 in the region of the transition between funnel 6 and crushing ring 18.

Angle α (see FIG. 2B) which is formed between a generatrix 33 of circular cone 4 and cone axis 31 is preferably at least slightly larger than an angle β (see FIGS. 3C, 4C) formed between a generatrix 53 of funnel 6 and a funnel axis 51.

The first grinding means 3 and the second grinding means 5 are disposed in such manner that the cone axis 31 and the funnel axis 51 are aligned coaxially. In particular, circular cone 4 is arranged inside funnel 6, wherein the apex of circular cone 4 points towards a small funnel opening 55. As a consequence of the different pitches of circular cone 4 and funnel 6, a gap is formed between the lateral surface 30 of circular cone 4 and the inner lateral surface 50 of funnel 6, which gap is smallest in the region of grinding gap 7 and increases towards the apex of circular cone 4 and towards the small funnel opening 55 due to the different values of angles α and β (see also FIGS. 2B, 3C, 4C).

The crushing unit 2 comprising first grinding means 3, second grinding means 5 and optionally crushing ring 18 is arranged inside crushing device 1 in such manner that the longitudinal axes of the grinding means 3, 5, in particular cone axis 31 and funnel axis 51 are aligned flush with the raw material inlet 12. The raw material R introduced from above through raw material inlet 12 first encounters small funnel opening 55 and the area of a cone apex 35 of circular cone 4. In particular, the raw material moves downwards towards the grinding gap 7 by the force of gravity. However, gravity alone is often not enough to transport the raw material R or the feedstock to the grinding gap 7. The improved transport of the raw material R to the crushing areas is therefore assured according to the invention by a transport channel of first grinding means 3, wherein the transport is assisted by the centrifugal force F acting on the raw material R or the feedstock. The transport channel comprises a first section 60 which extends in the axial direction, and at least one second section 62 which adjoins the first section 60 at an angle and penetrates an outer lateral surface 30 of the first axially rotatable grinding means 3. The rotation of the first grinding means 3 relative to the second grinding means 5 initiates a crushing action, in particular a grinding action of the coarse raw materials R. The size of grinding gap 7 in particular determines the degree of grinding of the ground product P, which is then discharged through product outlet 13.

The rotation of the first grinding means 3 also causes a radial acceleration of the raw material R along the transport channel. This in turn results in higher throughput of crushed raw material R per defined unit of time compared with the related art. The ground product P can also be ground to a greater degree of fineness, because the cutting frequency is significantly greater.

In addition, cooling chambers 27 may be disposed around second grinding means 5, in particular around funnel 6. They may be filled with a suitable cooling fluid K so that temperature control of second grinding means 5 and also of the added raw material R is possible. If the second grinding means 5 is cooled, the first grinding means 3 may be operated at a faster speed without overheating the raw material R as it is processed. In particular, cooling also makes it possible to grind temperature-sensitive materials gently with crushing device 1 (compare in particular FIG. 1A).

Figure 2A:
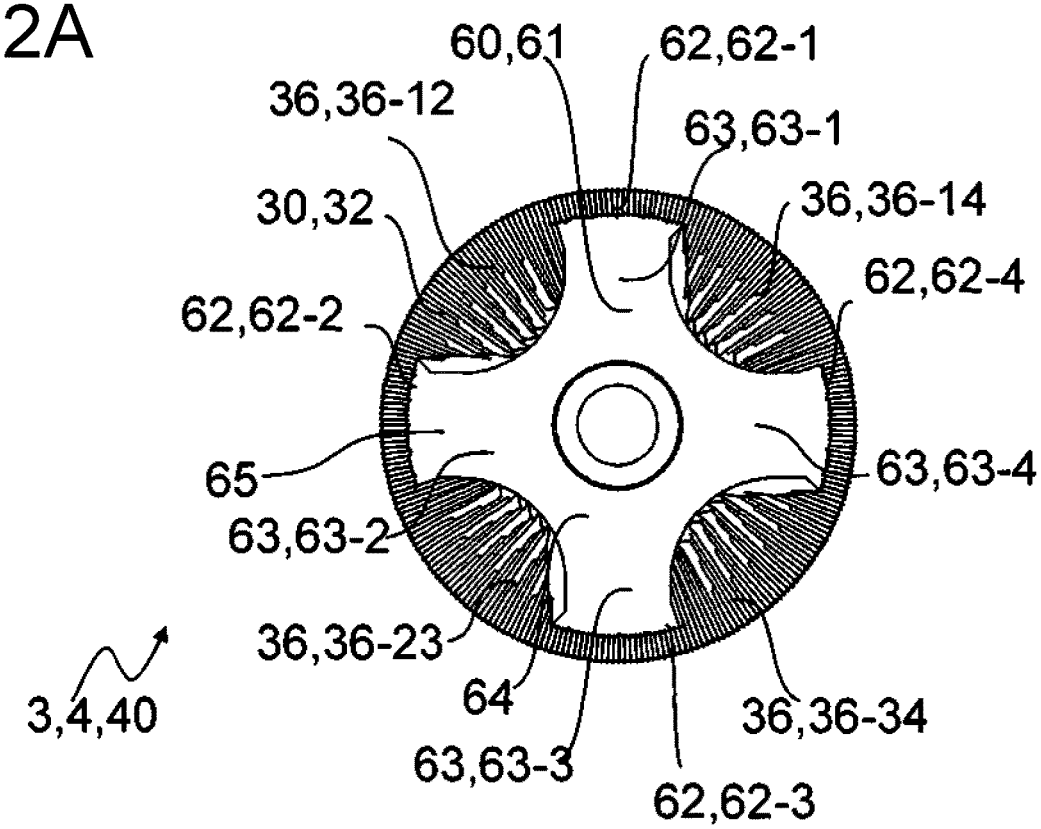
FIGS. 2A to 2H show different views of a first grinding means.
Figure 2B:
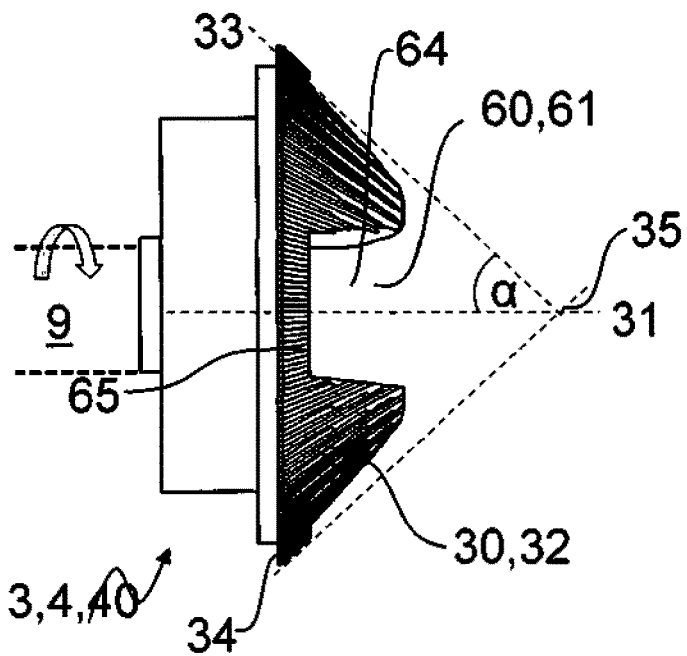
Figure 2C:
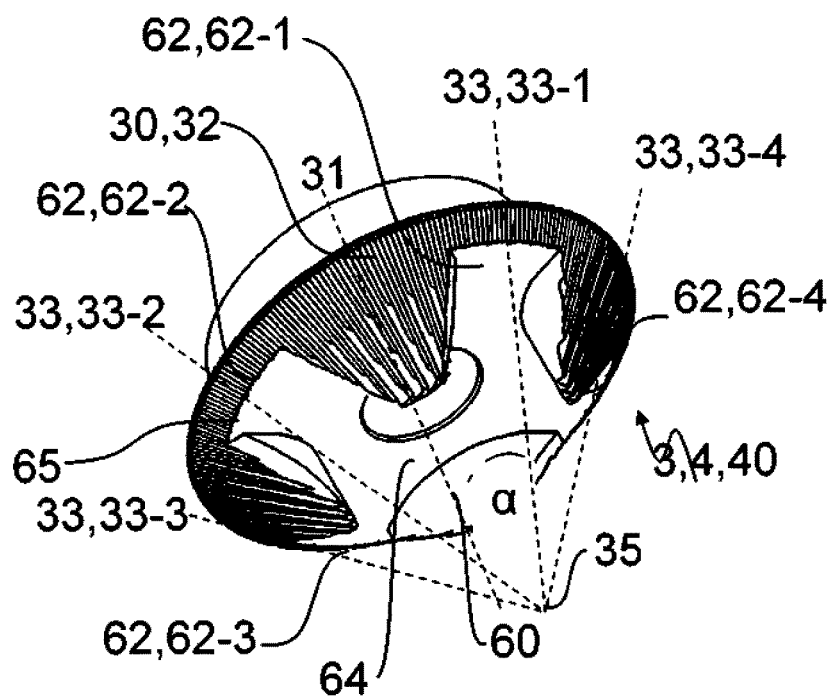
Figure 2D:
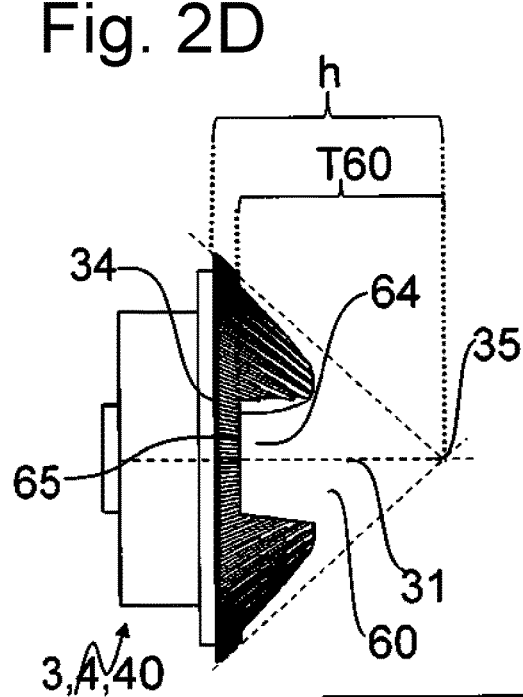
Figure 2E:
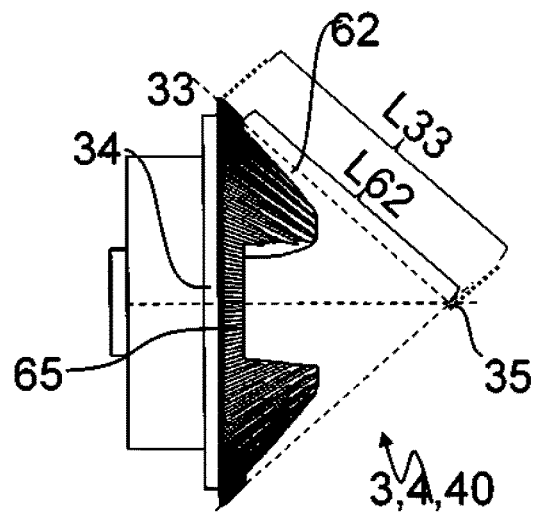
Figure 2F:
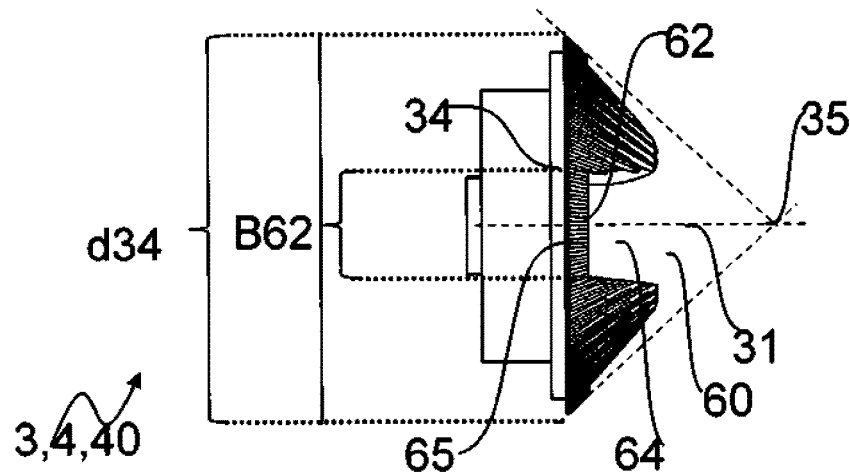
Figure 2G:
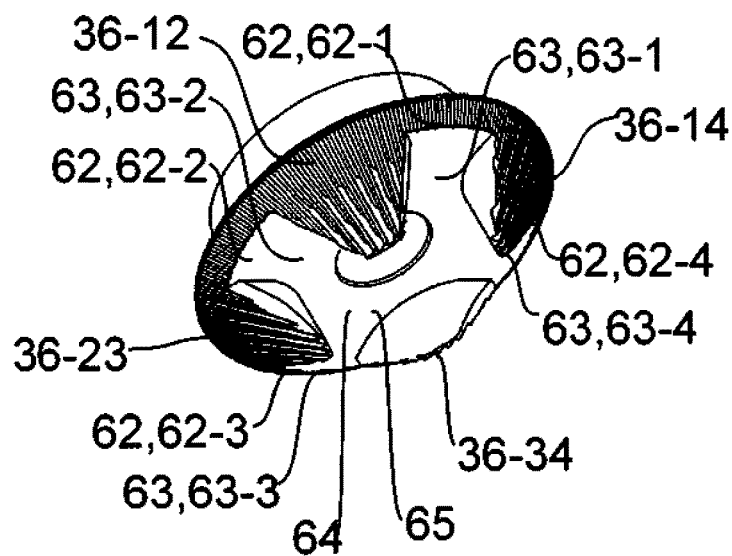
Figure 2H:
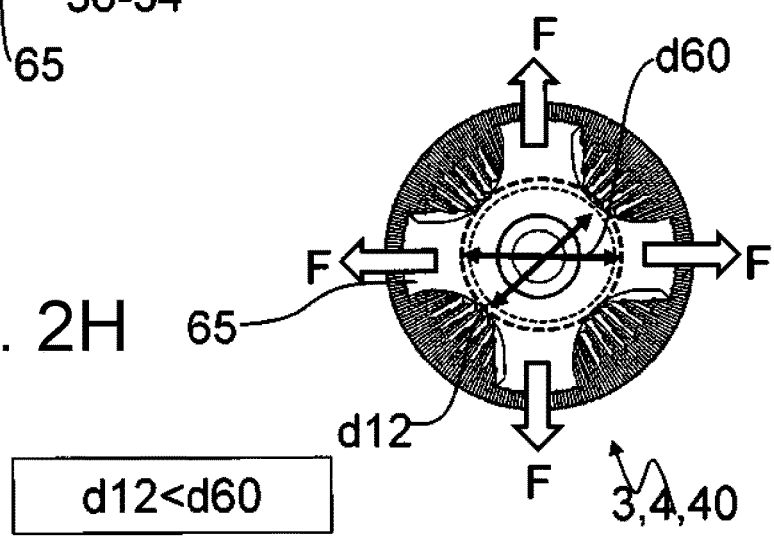

FIGS. 2A to 2H show various views of a first grinding means 3, FIGS. 2A and 2H in particular show a view of cone apex 35 from above, FIGS. 2B, 2D to 2F each show a view from the side, and FIGS. 2C and 2G each show a perspective view.

The external teeth 32 on the lateral surface 30 of grinding means 3, in particular of circular cone 4, are designed in the embodiment shown particularly as progressive toothing. The tooth density preferably decreases towards the cone apex 35, that is to say the tooth density is highest in the area of a cone base 34 of circular cone 4, where the grinding gap 7 is between the first and the second grinding means 3, 5 (see also FIG. 7).

In the present embodiment, grinding means 3 has the basic shape of a circular cone. In order to create the transport channels, the first grinding means 3 has a first section 60 or a central depression 61 starting from cone apex 35 which extends at least in part axially along the cone axis 31 towards cone base 34. The circular cone 4 also has at least one second section 62, which extends at least in part along generatrix 33 of circular cone 4 from the cone apex 35 towards the base surface or cone base 34. In the embodiment shown, the circular cone 4 has four second sections 62-1 to 62-4, each of which extends along a generatrix 33-1 to 33-4 of circular cone 4. The first grinding means 3 further includes third sections 63-1 to 63-4, each of which extends radial between the first axial section 60 and the second sections 62-1 to 62-4 along generatrixes 33-1 to 33-4 and connect first section 60 with each of the second sections 62-1 to 62-4.

Taken together, sections 60, 62, 63 lend the circular cone 4 a slotted appearance when viewed from the cone apex 35. Reference sign 40 is used in particular for the slotted circular cone. In particular, lateral surface 30 is divided into multiple partial surfaces 36-12, 36-23, 36-34 and 36-14 which are separated from each other laterally by second sections 62-1 to 62-4 and surround a hollow space 64 formed in the interior of circular cone 4 (compare in particular FIGS. 2A and 2G) by first section 60 and the third sections 63-1 to 63-4.

FIGS. 2D, 2E and 2F illustrate that a large proportion of the material of circular cone 4 is missing due to sections 60, 62, 63. According to FIG. 2D, for example, the first, axially extending section 60 has a depth T60, which in the embodiment is equal to approximately 90% of height h of circular cone 4, that is to say 90% of a distance between the cone apex 35 and an intersection point between the cone axis 31 and the cone base 34.

As shown in FIG. 2E. the second section 62 extends along a length L62 along generatrix 33 from the cone apex 35 towards base surface 34. Length L62 includes a portion of the total length L33 of generatrix 33, which corresponds in percentage terms to the quotient of the depth T60 of first section 60 and the height h of circular cone 4, and thus in the embodiment shown is also equal to about 90%.

According to FIG. 2F, it is further shown that the second sections 62 also have a width B62. In particular, sections 62 each extend over a constant width B62 parallel to generatrix 33 (see also FIG. 2C) starting from cone apex 35 along the partial length L62 shown in FIG. 2E. In the present case, width B62 of a second section 62 is equivalent to about 28% of diameter d34 of cone base 34.

The third sections 63 are constructed similarly, so that taken together section 60, 62, 63 form a hollow space 64 with an at least mostly flat surface 65 in a plane parallel to the plane of cone base 34 inside circular cone 4.

Hollow space 64 inside circular cone 4 is in particular partially surrounded by the partial areas 36-12, 36-23, 36-34 and 36-14 identified in FIG. 2G between the second sections 62-1 to 62-4.

As shown in FIG. 1, the first and the second grinding means 3, 5 are arranged inside crushing device 1 in such manner that the small funnel opening 55 and the slotted cone apex 35 formed by sections 60, 62, 63 are each directed towards the raw material inlet 12 (see also FIGS. 1 and 2). In particular, the first grinding means 3 is disposed in such manner that the raw material inlet 12 protrudes through the small funnel opening 55 of second grinding means 5 into the axial section 60 and thus also hollow space 64 of the slotted circular cone 40. Raw material R that is introduced and has already been crushed sufficiently and therefore has a lower gravity is accelerated radially by the centrifugal forces F generated by the rotation of the first grinding means 3 (see also FIG. 2H) and forwarded through radial sections 63 and sections 62 preferably directly to the fine crushing zone FZ between the first and the second grinding means 3, 5, in particular directly to the grinding gap 7.

If the raw material R of feedstock is nuts, for example, it typically already exists in such coarse form that it must always undergo crushing in area GZ first, before the ground material is fine enough to undergo fine grinding in area FZ.

Radial sections 63 cause the start of grinding to shift into the middle of the first grinding means 3, thus enlarging the area in which the feedstock or the added raw material R gets between grinding means 3, 5, instead of only being supplied from above over a relatively small circumference or sector at the apex of the truncated cone as is known from the related art. The raw material inlet 12 is particularly embodied as pipe 12* with a circular diameter (see also FIG. 1). Diameter d12 of the raw material inlet 12 is preferably smaller than the internal diameter d60 of the slotted circular cone 40 in the region of axial section 60 (see also FIG. 2H). According to one embodiment it is provided that the diameter d12 of raw material inlet 12 is at least slightly smaller than the internal diameter d55 of the second grinding means 5 (see also FIGS. 3A and 4A) in the region of the small funnel opening 55. in particular, it may be provided that the free end of the raw material inlet 12 or of pipe 12* passes through the small funnel opening 55 and into the inner hollow space 64 of the slotted circular cone 40.

In particular, it is important that sections 60, 62, 63 form a smooth surface 65 which the raw material R encounters first upon entry. Since the entering raw material R does not come into contact with the outer lateral surface 30 of the first grinding means 3 with the outer teeth 32 as happens in the related art, but instead meets a smooth surface 65 in the interior of circular cone 4 and is accelerated radially there immediately, the raw material R can be effectively prevented from collecting on the first grinding means 3 in the area of the material feed or of the raw material inlet 12 and/or sticking to the raw material inlet 12. In particular, the introduced raw material R is removed from the region of the material inlet more quickly.

Figure 3A:
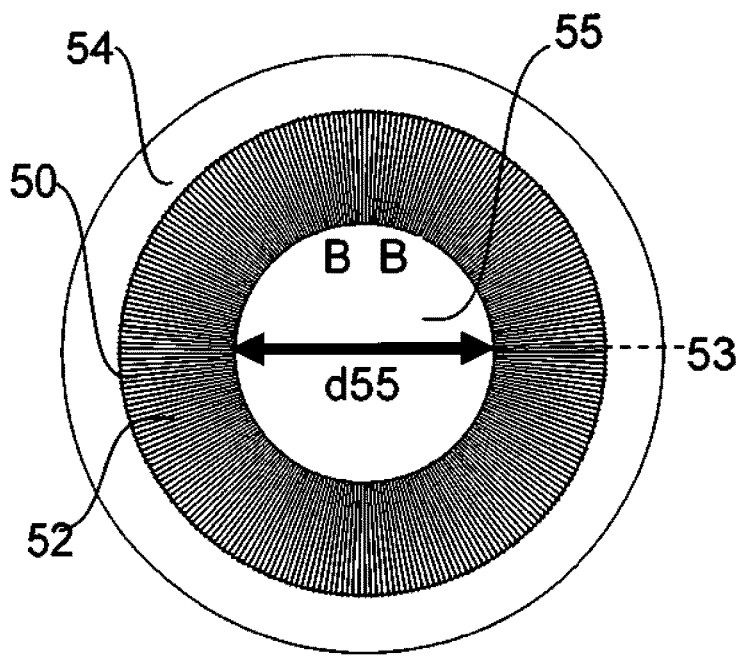
FIGS. 3A to 3C show different views of a first embodiment of a second grinding means.
Figure 3B:
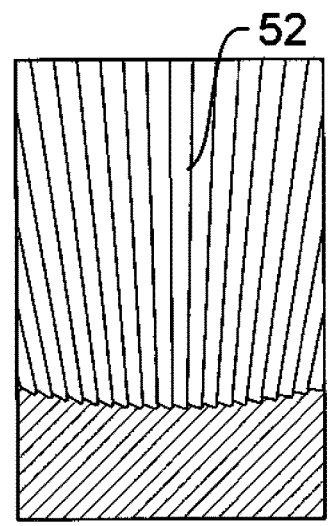
Figure 3C:
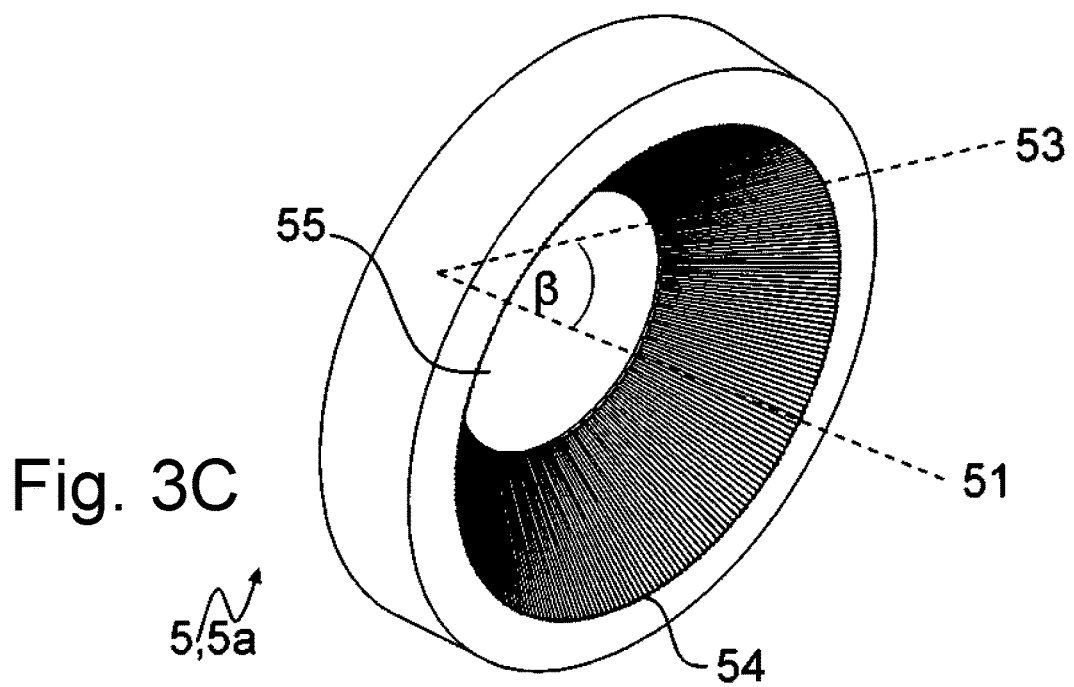

FIGS. 3A to 3C show different views of a first embodiment of a second grinding means 5a. In particular, FIG. 3A shows a top view, FIG. 3B shows a cross sectional view along section line B-B in FIG. 3A, and FIG. 3C is a perspective view.

Second grinding means 5a in particular is in the shape of a funnel 6. Funnel 6 comprises a large circular funnel opening 54 and a small circular funnel opening 55, the centres of which each lie on a funnel axis 51. The inner lateral surface 50 of funnel 6 is in the form of a hollow cone and is equipped with a multiplicity of internal teeth 52. The design of the internal teeth 52 is illustrated particularly clearly in FIG. 3B. They preferably extend along each generatrix 53 between the small and the large funnel openings 55, 54. In particular, the internal teeth 52 thus taper towards the small funnel opening 55.

FIGS. 4A to 4C shows different views of a second embodiment of a second grinding means 5b. In particular, FIG. 4A shows a view from above, FIG. 4B is a cross sectional view along a section line A-A in FIG. 4A, and FIG. 4C shows a perspective view. The description thereof is essentially the same as the description provided for FIG. 3.

Similarly to the progressive toothing of the first grinding means 3 represented in FIG. 2, the internal teeth 52 of the second grinding means 5*b* are also designed as progressive toothing. Although the individual internal teeth 52 each become narrower towards the small funnel opening 55, the density of the internal teeth 52 decreases towards small funnel opening 55 due to the progressive toothing. The progressive toothing is particularly created by a regular arrangement of teeth 52*a*, 52*b* and 52*c* extending with various lengths towards small funnel opening 55.

The lower tooth density in the region of the raw material inlet also prevents the danger of the teeth 52 becoming clogged and caked with lumps of coarse raw material components and supports a first coarse crushing step of the raw material R in an area GZ (see also FIG. 1). The coarser toothing arrangement in the area of the raw material inlet have the effect of lowering resistance associated with the effect of centrifugal forces on the supplied raw material and with the introduction and removal of the supplied raw materials towards the area for fine crushing FZ (see also FIG. 2) via the transport channels formed by sections 60, 62 and 63.

Figure 5:
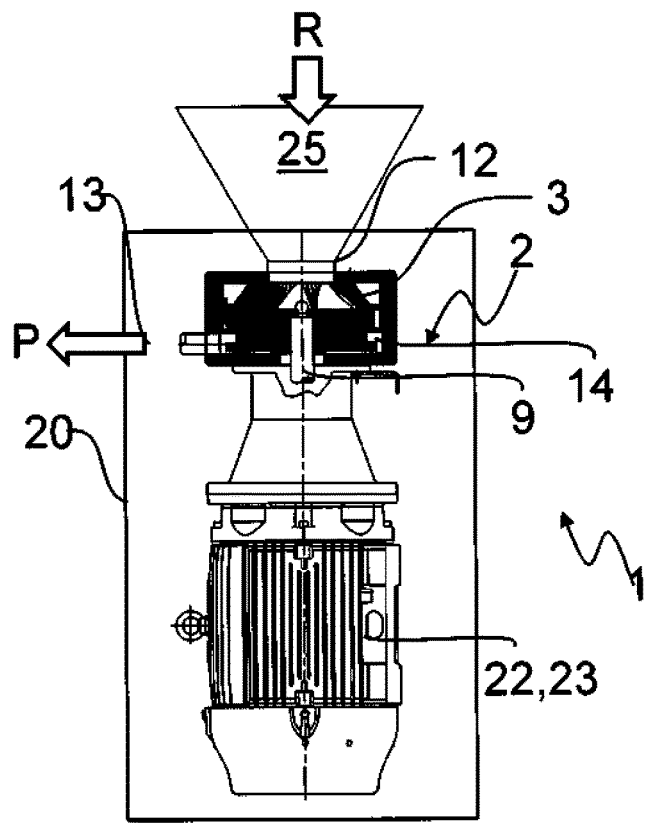
FIG. 5 shows a schematic view of a crushing device.
Figure 6:
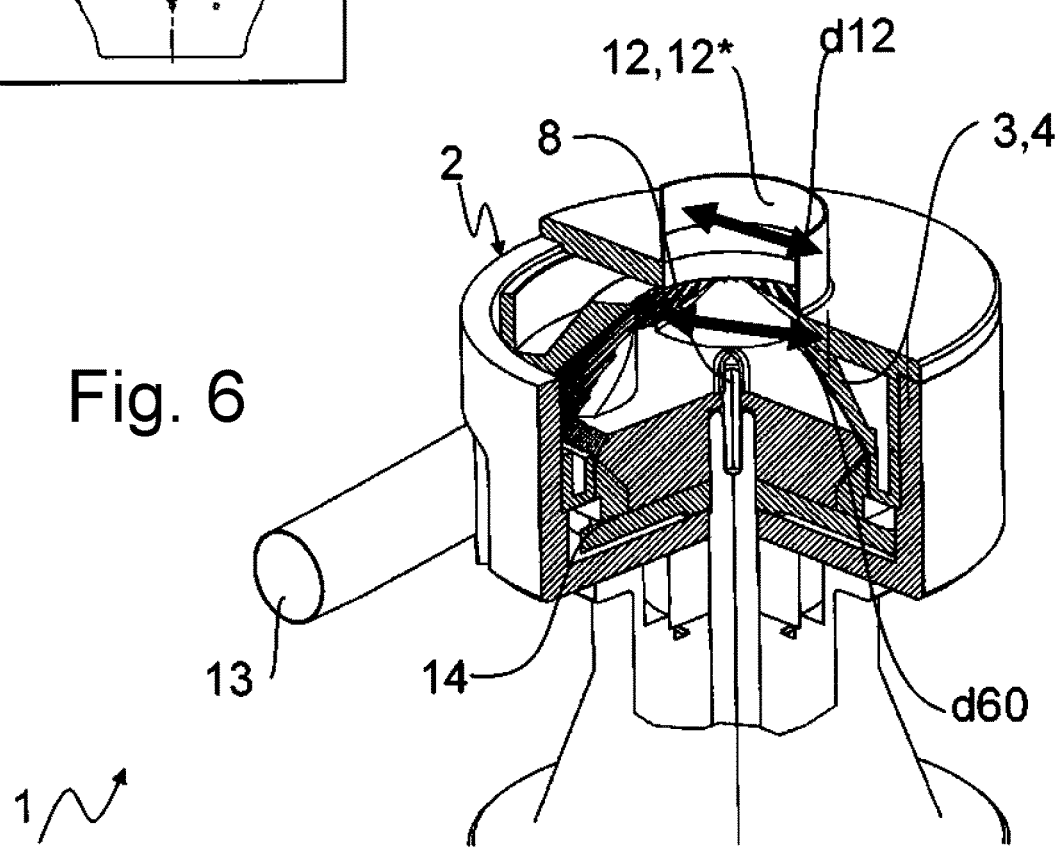
FIG. 6 shows a perspective view of a crushing unit of a crushing device.

FIG. 5 is a schematic view of a crushing device 1. FIG. 6 is a perspective view of a crushing unit 2 of a crushing device 1 according to FIGS. 1 and 5.

Crushing device 1 comprises a crushing unit 2 such as was described in detail previously, particularly in connection with FIG. 1. Crushing device 1 comprises a housing 20 in which crushing unit 2 and a drive unit 22 of the crushing unit 2 are arranged. The driveshaft 9 to which the first grinding means 3 is attached is mounted on drive unit 22, for example an electric motor 23, and is driven in rotary manner by drive unit 22. A hopper 25 for example is arranged on raw material inlet 12, and raw material R may simply be poured into said and then fed to the crushing unit via the raw material inlet 12.

In addition, a discharge rotor 14 is also mounted on the driveshaft 9 in the area of product outlet 13 between drive unit 22 and crushing unit 2, and supports the discharge of the crushed product P via product outlet 13.

Figure 7A:
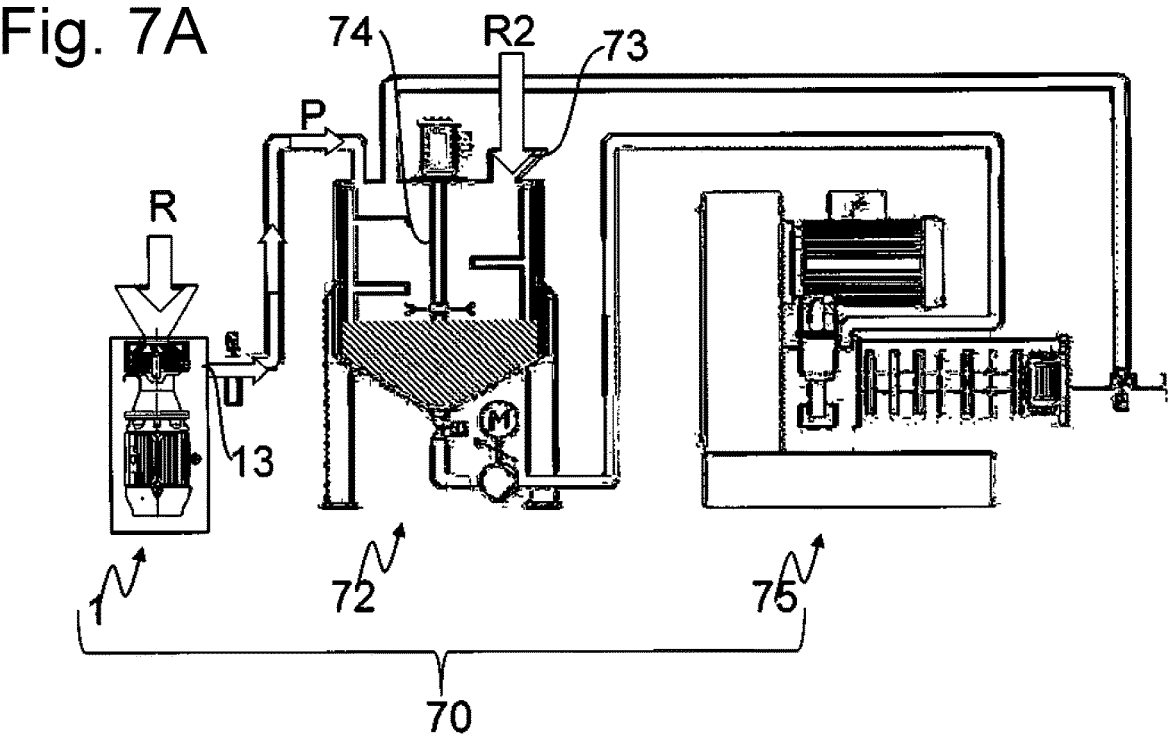
FIGS. 7A and 7B show the use of a crushing device in a system for manufacturing chocolate and/or confectionery masses.
Figure 7B:
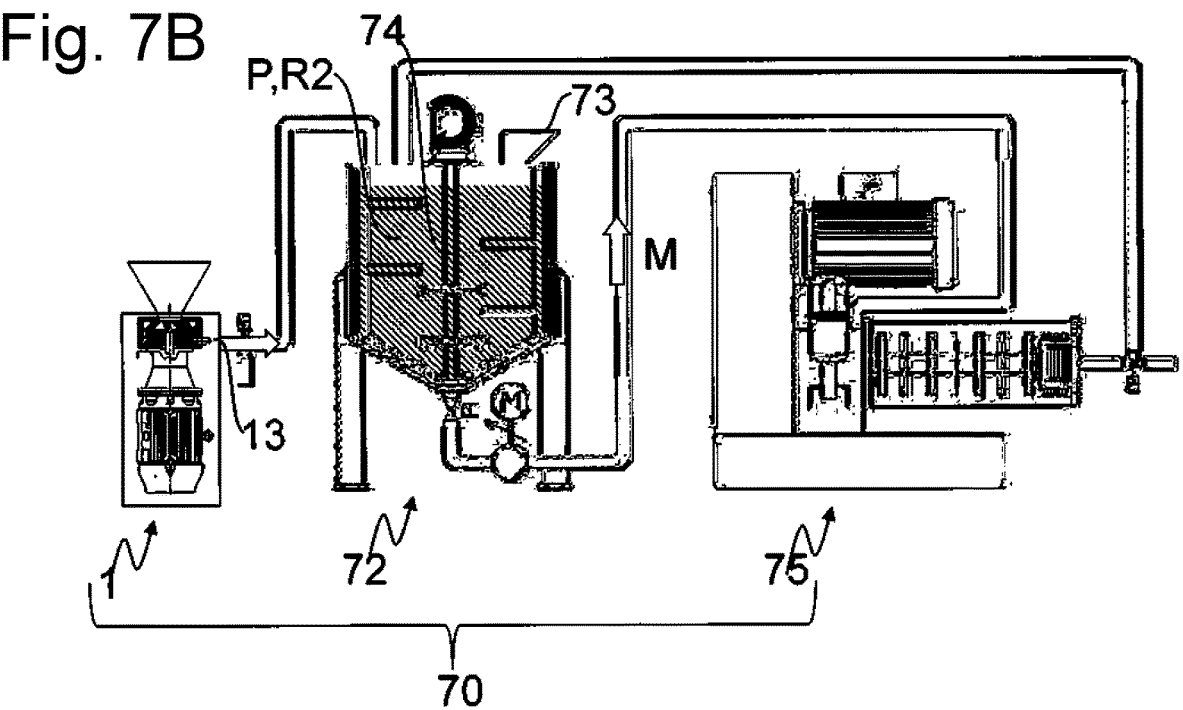

FIGS. 7A and 7B illustrate the use of a crushing device 1 in a system 70 for manufacturing chocolate and/or confectionery masses, masses for sweet production etcetera. First, the coarse-grained raw materials R are ground finely in crushing device 1, and then the finely ground product P is removed via product outlet 13 of crushing device 1 and transferred to a mixing device 72. Said mixing device is equipped with a further raw material inlet 73, via which further raw materials R2, for example liquid raw materials such as fats or similar are added. Then the finely ground product P and the further raw materials R2 are mixed together in the mixing device 72 to form an at least mostly homogeneous mixture M. For this purpose, mixing device 72 is preferably equipped with at least one suitable stirrer 74. Mixture M is then transferred to a conching device 75 to undergo another product refinement step, by which the residual moisture in the mixture M is gently removed.

The invention has been described with reference to a preferred embodiment. However, it is conceivable for a person skilled in the art to introduce variants or modifications to the invention without thereby departing from the scope of protection of the following claims.

The invention claimed is:

1. A crushing device comprising at least two parts for crushing coarse-grained materials, including
    a first axially rotatable grinding means with an outer lateral surface and a hollow space at least partially surrounded by the outer lateral surface, the first axially rotatable grinding means having a shape of a circular cone;
    a funnel-shaped second grinding means which is fixed with respect to the first axially rotatable grinding means, the second grinding means accommodates the first axially rotatable grinding means and is in operative connection with the first axially rotatable grinding means for the purpose of crushing the coarse-grained material;
    wherein the outer lateral surface faces an inner lateral surface of the second grinding means, the outer lateral surface and the inner lateral surface each comprise teeth;
    wherein the first axially rotatable grinding means has at least one transport channel for the respective material to be crushed;
    wherein the at least one transport channel has at least one first section extending axially and at least two second sections which adjoin the at least one first section at an angle and penetrate the outer lateral surface of the first axially rotatable grinding means such that the outer lateral surface is divided into multiple partial surfaces, which are separated from each other by the at least two second sections and which at least partially surround the hollow space;
    wherein the at least one first section forms a part of the hollow space of the first axially rotatable grinding means;
    wherein the circular cone shape of the first axially rotatable grinding means is defined by a cone axis, a cone apex, and a cone base;
    wherein each second section extends along part of a generatrix of the circular cone shape from the cone apex towards a base surface;
    wherein the at least one first section extends axially along the cone axis;
    wherein each second section extends along a partial length of a total length of the generatrix from the cone apex towards the base surface, wherein a ratio of the partial length to the total length is equal to a ratio of a depth of the at least one first section to a distance between an intersection point of the base surface with the cone axis and the cone apex.

2. The crushing device according to claim 1, wherein the at least one transport channel has at least one third section which extends radially starting from the at least one first section to the at least two second sections.

3. The crushing device according to claim 2, wherein the at least two second sections comprise two second sections that extend along opposite generatrixes, wherein the two second sections are connected to each other and to the at least one first section by the at least one third section, wherein the at least one third section extends from the one generatrix to the other generatrix.

4. The crushing device according to claim 3, wherein each second section extends along a partial length of a total length of the generatrix from the cone apex towards the base surface, wherein a ratio of the partial length to the total length is equal to a percentage, and wherein said percentage is at least one percent greater than a percentage ratio of a depth of the at least one first section to a distance between an intersection point of the base surface with the cone axis and the cone apex.

5. The crushing device according to claim 2, wherein the at least two second sections comprise three second sections, which are arranged at angular intervals of 120 degrees on the outer lateral surface,
wherein the at least one third section comprises three third sections, and
wherein each second section is connected to the at least one first section by one of the three third sections, wherein each third section extends radially starting from the at least one first section as far as one of the three second sections.

6. The crushing device according to claim 2, wherein the at least two second sections comprise four second sections, which are arranged at angular intervals of 90 degrees on the outer lateral surface,
wherein the at least one third section comprises two third sections, and
wherein the respectively opposite second sections are each connected to each other and to the at least one first section by one of the two third sections, wherein the respective third section extends from a second section to the opposite second section.

7. The crushing device according to claim 2, wherein the at least one third section connects the at least two second sections to the at least one first section so that a surface that is convex with respect to the base surface is formed inside the hollow space, wherein a greatest distance between the convex surface and the base surface is located at the cone axis.

8. The crushing device according to claim 2, wherein the at least one first section has a depth corresponding to between 5% and 95% of a distance between an intersection point of the base surface with the cone axis and the cone apex.

9. The crushing device according to claim 1, wherein the at least one first section has a depth corresponding to between 5% and 95% of a distance between an intersection point of the base surface with the cone axis and the cone apex.

10. The crushing device according to claim 9, wherein at least one third section connects the at least two second sections to the at least one first section so that an at least substantially flat surface is formed in a plane parallel to the base surface.

11. The crushing device according to claim 1, wherein the at least one first section has a depth corresponding to at least 80% of a distance between an intersection point of the base surface with the cone axis and the cone apex.

12. A method for crushing a coarse-grained material, comprising:
feeding the coarse-grained material into a crushing device that includes a first axially rotatable grinding means and a funnel-shaped second grinding means which is fixed with respect to the first axially rotatable grinding means, the second grinding means accommodates the first axially rotatable grinding means and is in operative connection with the first axially rotatable grinding means for the purpose of crushing the coarse-grained material, the first axially rotatable grinding means has an outer lateral surface and a hollow space at least partially surrounded by the outer lateral surface, the outer lateral surface having a shape of a circular cone, the outer lateral surface faces an inner lateral surface of the second grinding means, the outer lateral surface and the inner lateral surface each comprise teeth,
wherein when the material enters the crushing device, the material is accelerated radially and delivered to an area between the outer lateral surface and the inner lateral surface via at least one transport channel of the first axially rotatable grinding means, the at least one transport channel has at least one first section extending axially and at least two second sections which adjoin the at least one first section at an angle and penetrate the outer lateral surface of the first axially rotatable grinding means such that the outer lateral surface is divided into multiple partial surfaces, which are separated from each other by the at least two second sections and which at least partially surround the hollow space, wherein the at least one first section forms a part of the hollow space of the first axially rotatable grinding means, and
crushing the material within the area between the outer lateral surface and the inner lateral surface using the teeth of the outer lateral surface and the inner lateral surface;
wherein the circular cone shape of the first axially rotatable grinding means is defined by a cone axis, a cone apex, and a cone base;
wherein each second section extends along part of a generatrix of the circular cone shape from the cone apex towards a base surface;
wherein the at least one first section extends axially along the cone axis
wherein each second section extends along a partial length of a total length of the generatrix from the cone apex towards the base surface, wherein a ratio of the partial length to the total length is equal to a ratio of a depth of the at least one first section to a distance between an intersection point of the base surface with the cone axis and the cone apex.

13. The method according to claim 12, wherein upon entering the crushing device the material encounters a smooth surface of the first axially rotatable grinding means, is accelerated radially, and is fed to a coarse crushing area.

14. The method according to claim 13, wherein the at least one first section and the at least two second sections provide a passage via which the material is guided to a crushing zone between the first axially rotatable grinding means and the second grinding means.

15. The method according to claim 12, wherein the at least one first section and the at least two second sections provide a passage via which the material is guided to a crushing zone between the first axially rotatable grinding means and the second grinding means.

16. The method according to claim 12,
wherein the first axially rotatable grinding means has the at least one transport channel for the respective material to be crushed; and
wherein the at least two second sections extend along part of the outer lateral surface of the first axially rotatable grinding means.

17. A crushing device comprising at least two parts for crushing coarse-grained materials, including
a first axially rotatable grinding means with an outer lateral surface having a shape of a circular cone;
a funnel-shaped second grinding means which is fixed with respect to the first axially rotatable grinding means, the second grinding means accommodates the first axially rotatable grinding means and is in operative connection with the first axially rotatable grinding means for the purpose of crushing the coarse-grained material;

wherein the outer lateral surface faces an inner lateral surface of the second grinding means, the outer lateral surface and the inner lateral surface each comprise teeth;

wherein the first axially rotatable grinding means has at least one transport channel for the respective material to be crushed;

wherein the at least one transport channel has at least one first section extending axially and at least one second section which adjoins the at least one first section at an angle and extends along part of the outer lateral surface of the first axially rotatable grinding means;

wherein the circular cone shape of the first axially rotatable grinding means is defined by a cone axis, a cone apex, and a cone base;

wherein the at least one second section extends along part of a generatrix of the circular cone shape from the cone apex towards a base surface;

wherein the at least one first section extends axially along the cone axis;

wherein the at least one second section extends along a partial length of a total length of the generatrix from the cone apex towards the base surface, wherein a ratio of the partial length to the total length is equal to a ratio of a depth of the at least one first section to a distance between an intersection point of the base surface with the cone axis and the cone apex; and wherein the at least one first section has a depth corresponding to between 50% and 95% of a distance between an intersection point of the base surface with the cone axis and the cone apex.

* * * * *